United States Patent
Menon et al.

(10) Patent No.: US 6,452,974 B1
(45) Date of Patent: *Sep. 17, 2002

(54) SYNCHRONIZATION OF RELATED AUDIO AND VIDEO STREAMS

(75) Inventors: Rama R. Menon; Sheng-Hui Chu, both of Portland; Yueheng Xu, Beaverton, all of OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/705,464

(22) Filed: Nov. 2, 2000

Related U.S. Application Data

(63) Continuation of application No. 09/002,543, filed on Jan. 2, 1998, now Pat. No. 6,269,122.

(51) Int. Cl.[7] .................................................. H04B 5/04
(52) U.S. Cl. .............................. 375/240.28; 348/425.4; 348/515
(58) Field of Search ............................. 348/515, 425.4, 348/439, 15, 390, 17–19; 345/328, 302; 386/96; 375/240.28; H04N 5/91, 7/15, 5/04

(56) References Cited

U.S. PATENT DOCUMENTS

| | | | | |
|---|---|---|---|---|
| 3,715,483 A | * | 2/1973 | Limb et al. | |
| 5,608,653 A | * | 3/1997 | Palmer et al. | |
| 6,269,122 B1 | * | 7/2001 | Prasad | |

* cited by examiner

*Primary Examiner*—David E. Harvey
(74) *Attorney, Agent, or Firm*—Blakely, Sokoloff, Taylor & Zafman LLP

(57) ABSTRACT

A method and apparatus for synchronizing audio and video streams in a video conferencing system is provided. During a video conferencing session, audio and video streams are transmitted from one processing system to a remote processing system, where they are recorded. Because the video stream has a variable frame rate during transmission, extra frames are inserted into the recorded video stream in order to maintain a constant, predetermined frame rate. During playback, synchronization information from the audio stream is provided by an audio playback process to a video playback process in order to synchronize the start of playing the audio and video streams, as well as to repeatedly synchronize the audio and video streams during playback.

16 Claims, 6 Drawing Sheets

SYNCHRONIZATION OF RELATED AUDIO AND VIDEO STREAMS

The present application is a continuation of U.S. patent application Ser. No. 09/002,543, filed on Jan. 2, 1998, now U.S. Pat. No. 6,269,122.

FIELD OF THE INVENTION

The present invention pertains to the field of video conferencing systems. More particularly, the present invention relates to synchronization of audio and video in a video conferencing system.

BACKGROUND OF THE INVENTION

Video conferencing provides a way for people at distant locations to simulate a live face-to-face meeting. Video conferencing techniques generally call for broadcasting live ("real time"), two-way audio and video interactively between two or more remote sites. Generally, a computer, video camera, and speaker are employed at each site participating in a video conference. Video conferencing software executing on each computer manages the equipment and the video conferencing session. The session is interactive in that it allows participants to make changes to documents that others can see in real-time. A windows-based graphical user interface is generally employed so that live video feed can be seen by a user in one window, while other computer-generated images are displayed in other windows. The participating computer systems may be connected by any of various types of communication links, such as conventional telephone lines, otherwise known as Plain Old Telephone Service (POTS), a local area network (LAN), or Integrated Services Digital Network (ISDN) connections. Various standards exist to define video conferencing using such media. For example, International Telecommunications Union (ITU) standard H.320 is a specification which defines multipoint video conferencing over circuit switched media, such as ISDN. ITU standard H.323 defines video switched media, such as ISDN. ITU standard H.323 defines video communication on LANs, while ITU standard H.324 is directed to video and audio communication using POTS.

One problem encountered in video conferencing is that of synchronizing associated audio and video streams, i.e., synchronizing audio and video streams acquired concurrently by a camera and a microphone of a participating processing system. Synchronization can be difficult when the audio and video streams are processed independently in the transmitting or receiving system or both, as is generally the case. Typically, the audio and video data streams are processed by separate hardware subsystems under the control of separate software drivers. Hence, audio and video data from a given site are separated into separate data streams that are transmitted to separated audio and video subsystems at a remote site. Because the audio and video data streams are processed independently, there is often no explicit synchronization between these two recorded data streams.

The problem of synchronization, which is often referred to as "lip sync", is of particular concern in a video conferencing system that has the capability to record and play back audio and video. An example of such a system is the Intel Proshare® video conferencing system, which is available from Intel Corporation of Santa Clara, California. The Proshare® system includes the capability to record and then play back live audio and video received from a remote site during a video conferencing session. The synchronization problem is of concern in this context, because the video sequence may be played at a noticeably different speed than that of the audio sequence, due to the independent processing of the audio and video streams. This result is likely to occur if the recorded file does not contain original time stamp information for each frame in the stream, as is the case for a file recorded in the well-known Microsoft Media Player AVI (Audio Visual Interleave) format.

Synchronization problems tend to worsen in the context of receiving real-time audio and video data streams from a remote processing system, such as during video conferencing. One reason for this worsening is that transmitted audio and video data, from one participating processing system tend to arrive at another participating processing system at unpredictable, irregular time intervals due to delays in the data channel and the processing load of the system. In a stand alone computer system running a playback application, such as Media Player, the audio/video lip sync problem might be solved by minimizing the latency between the start of playing the audio stream and the start of playing the video stream. However, in a real-time video conference, at least two factors contribute to difficulties of minimizing such latency.

First, the video stream tends to take an unpredictable amount of time to start playing. This time delay often cannot be compensated for, since the delay dynamically changes due to many factors, such as fluctuation in the processing load, transportation protocol, and video mode. Because audio is generally given highest priority in a video conference, the audio data stream normally has a constant data rate. Non-audiovisual data is often given the next highest priority, while video data is given the lowest priority. Consequently, the frame rate of the video stream may vary based on the above factors, while the audio frame rate does not. Second, because of the randomness of the machine load, even if the start of the audio and video streams is synchronized, the playing of the streams may gradually drift out of sync. The effect of a variable video frame rate may be perceived by a user as a jerky image, which may distract the user or otherwise degrade the perceived quality of the video conferencing session.

Another difficulty associated with recording a real-time transmission is that the audio and video frames are randomly delayed and may arrive at unpredictable time intervals. Such intervals are difficult to duplicate during playback without explicit time stamp information. Yet time stamp information may not be available. Furthermore, synchronization techniques based on time stamping tend to require explicit synchronization at the transmitting end.

Therefore, it is desirable to provide a technique for synchronizing audio and video streams without the need for time stamp information, in order to facilitate the recording and playback of audio and video streams in a video conferencing session or other real-time audiovisual transmission.

SUMMARY OF THE INVENTION

One aspect of the present invention is a method of enabling synchronization of a video stream with another data stream. The video stream has multiple video frames and a variable frame rate. The method comprises receiving the video stream and adding video frames to the video stream based on the variable frame rate.

Another aspect of the present invention is a method of synchronizing an audio stream with a video stream. An audio stream and an associated video stream that have been transmitted from a remote source are received. The data rate of one of the transmitted audio and video streams is variable during the transmission, while the data rate of the other is fixed. The associated audio and video streams are recorded. The recorded audio and video streams are then played, using information from the recorded audio stream to adjust the playing of the recorded video stream. In particular embodiments in which the video frame rate is variable, video frames may be added to the video stream based on the variable frame rate, prior to playing the audio and video streams.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A technique for synchronizing recorded audio and video streams in a video conferencing system is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram or other symbolic form in order to facilitate description of the present invention.

During a video conferencing session, audio and video streams are transmitted from one processing system to a remote processing system, where they may be recorded. The video stream may have a variable frame rate during transmission, due to various factors. Hence, in accordance with the present invention, extra ("dummy") frames are inserted into the video stream in order to maintain a constant, predetermined frame rate. Further, synchronization information from the audio stream is provided by an audio playback process during playback to a video playback process, in order to synchronize the start of playing the audio and video streams and to repeatedly resynchronize the audio and video streams during playback. These techniques are described further below.

Figure 1:
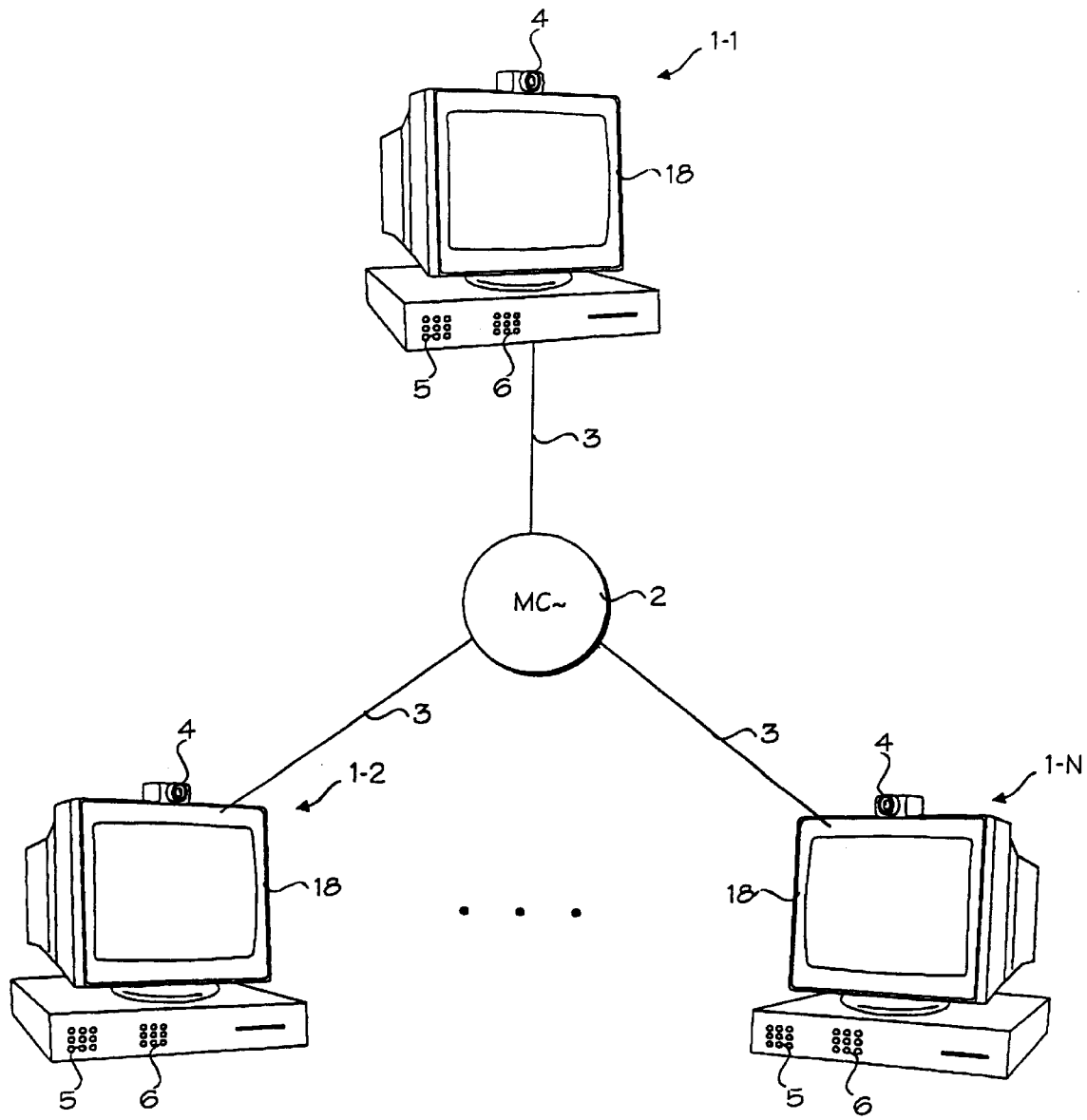
FIG. 1 illustrates a number of computer systems configured for video conferencing and connected by a Multi-point Conferencing Unit (MCU).

FIG. 1 illustrates a number of computer systems 1-1, 1-2, . . . , 1-N connected to carry out a video conferencing session. Computer systems 1-1 through 1-N are connected via communication links 3 through a Multi-point Conferencing Unit (MCU) 2. Note that a video conference in which the present invention is applied may alternatively involve only two computer systems, which may be connected directly rather than through an MCU. Each of computer systems 1-1 through 1-N includes a display monitor 18, a video camera 4, a microphone 5, and a speaker 6. The communication links 3 may be POTS lines, ISDN connections, Digital Subscriber Line (xDSL) connections, or any other suitable type of communication link. In an embodiment in which communications links 3 are ISDN links, a video conferencing session may be based on the H.320 standard. Each of computer systems 1-1 through 1-N includes and executes appropriate video conferencing software, such as Intel's Proshare® video conferencing system.

Figure 2:
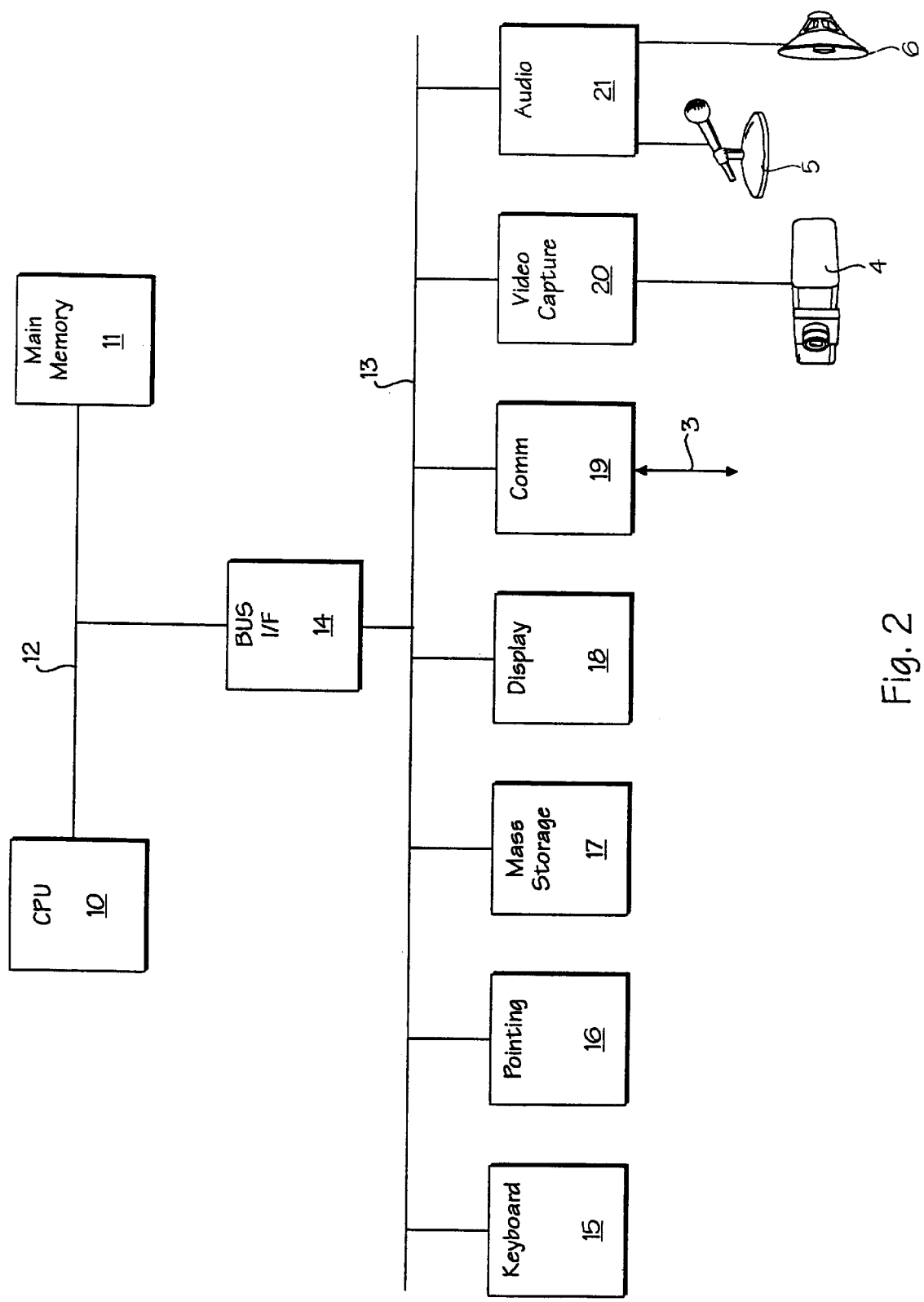
FIG. 2 is a block diagram of one of the computer systems of FIG. 1.

FIG. 2 is a block diagram of computer system 1-1. For purposes of the present invention, computer systems 1-2 through 1-N are essentially identical to computer system 1-1. Computer system 1-1 includes a Central Processing Unit (CPU) connected to main memory 11 by a system bus 12. Main memory 11 includes Random Access Memory (RAM) and may also include Read Only Memory (ROM). The system bus 12 is coupled to a peripheral bus 13 via a bus interface 14. The bus interface 14 may include any of a number of well-known bridges, controllers, and/or adapters for linking busses 12 and 13, and for enabling the components of computer system 1-1 to communicate with each other. The peripheral bus 13 may be any of a number of well-known expansion busses, an example of which is the Peripheral Component Interconnect (PCI) bus. A number of components are connected to the peripheral bus 13, including a keyboard 15, a pointing device 16, a mass storage device 17, the display 18, and communication device 19. The pointing device 16 may be any device suitable for positioning a pointer on the display 18, such as a mouse, trackball, touchpad, stylus with light pen. The mass storage device 17 may include any device suitable for storing large volumes of data, such as a magnetic disk or tape, Magneto-Optical (MO) storage device, or any of numerous variations of Compact Disk (CD) based storage device (e.g., CD-ROM, CD-R, CD-RW) or Digital Versatile Disk (DVD) based storage device. The communication device 19 is any device suitable for enabling the computer system 1-1 to communicate audio, video and other data with remote computer systems via links 3. Accordingly, communication device 19 may be, for example, a conventional modem, an ISDN adapter, an xDSL adapter, or an Ethernet or other LAN adapter.

The video camera 4 is also coupled to the peripheral bus 13 via a video capture board 20. Similarly, the microphone 5 and speaker 6 are coupled to bus 13 via audio circuitry 21. Circuits 20 and 21 provide appropriate circuitry for interfacing the video and audio input/output components to the bus 13, such as analog-to-digital and digital-to-analog conversion, compression and decompression, and other standard functions which are well-known in the art.

It will be noted that the architecture illustrated in FIG. 2 is provided only for purposes of illustration and that numerous variations on this architecture can be used within the scope of the present invention. For example, in other embodiments some or all of the components shown as connected to the peripheral bus 13 might instead be connected in a daisy chain to a Universal Serial Bus (USB) or a bus which conforms to the Institute of Electrical and Electronics Engineers (IEEE) standard known as "IEEE 1394-1995 Standard for a High-Speed Performance Serial Bus"(otherwise known as "IEEE 1394"). Such a bus may replace or supplement bus 13 in computer system 1-1.

In one embodiment, the present invention is carried out in a computer system, such as system 1-1, in response to its CPU executing sequences of instructions contained in memory. The instructions may be part of a video conferencing software application, for example. The instructions may be executed from main memory, for example, and may be loaded into main memory from a persistent store, such as a mass storage device. Alternatively, the instructions may be loaded from one or more other remote computer systems (collectively referred to as "host computer system"). The receiving computer system 1 may store the instructions for later execution or execute the instructions as they arrive over the network. In other embodiments, hardwired circuitry may be used in place of, or in combination with, software instructions to implement the present invention. Thus, the present invention is not limited to any specific combination of hardware circuitry and software, nor to any particular source for the instructions executed by a computer system.

Figure 3:
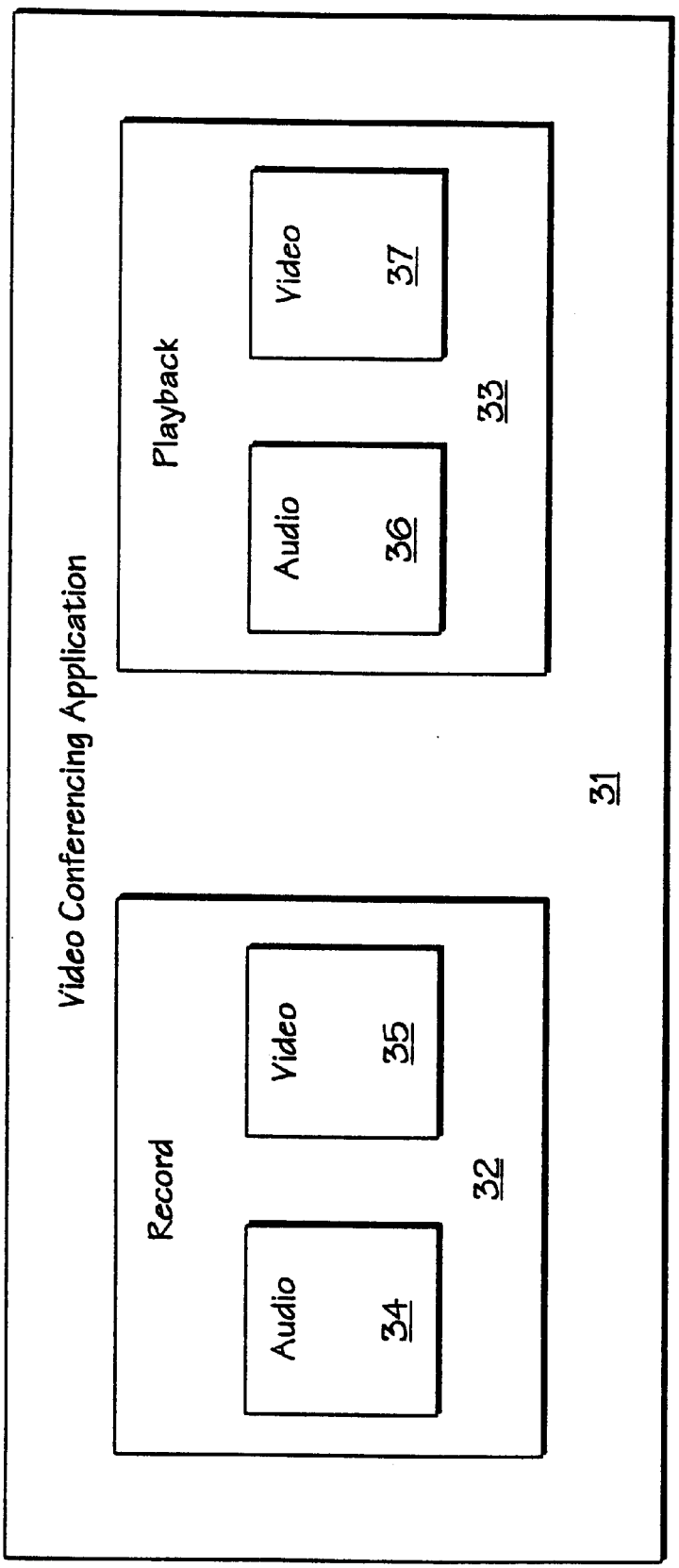
FIG. 3 is a block diagram of video conferencing application software.

Each of the computer systems 1-1 through 1-N includes and executes video conferencing application software 31 in accordance with the present invention. Such software is depicted in FIG. 3. The application software 31 provides the capabilities to both record and play back audio and video data received from a remote processing system. The audio and video data that is recorded may be real-time data recorded during a video conferencing session (i.e., multiple participants) or it may be recorded automatically be a computer system in a manner similar to a conventional telephone answering machine answering a telephone call.

In accordance with the present invention, the application software 31 includes both a record process 32 and a playback process 33. The record and playback processes 32 and 33 each are a collection of subroutines for performing their respective functions. The functions of the record process 32 include recording, on a local processing system, audio and video data received from a remote processing system. The record process 32 therefore includes an audio record process 34 for recording a received real-time audio data stream and a video record process 35 for recording the received real-time video data stream. The functions of the playback process 33 include playing back recorded audio and video data on the local system (using the speaker 6 and the display device 18, respectively). The playback process 33 therefore includes an audio playback process 36 for playing back a recorded audio data stream and a video-playback process 37 for playing back a recorded video data stream. The audio and video data which are played back by playback process 33 may or may not have been recorded by the local processing system. That is, while the recorded data to be played back may have been received and recorded by the local processing system from a real-time transmission, it may instead have been received by the local system from another computer system, where it had been recorded earlier.

As noted above, the video stream may have a variable frame rate. For example, if the nominal video frame rate is 15 frames per second, the actual video frame rate in the received video stream will likely fall below that rate from time to time. On reason for this effect is that, as mentioned above, video is generally given lower priority in a video conferencing session than both audio and non-audiovisual data, in terms of its bandwidth allocation. Therefore, the present invention provides that dummy video frames are inserted into the video stream in order to guarantee a constant, known video frame rate, i.e., the nominal frame rate. Each dummy frame may be, for example, a blank frame or a copy of the immediately preceding frame; the content of a dummy frame is not important for purposes of practicing the present invention. Subsequently, during the playback process, synchronization information from the recorded audio stream is provided from the audio playback process 36 to the video playback process 37 in order to repeatedly synchronize the video playback to the audio playback, as will be described below.

Figure 4:
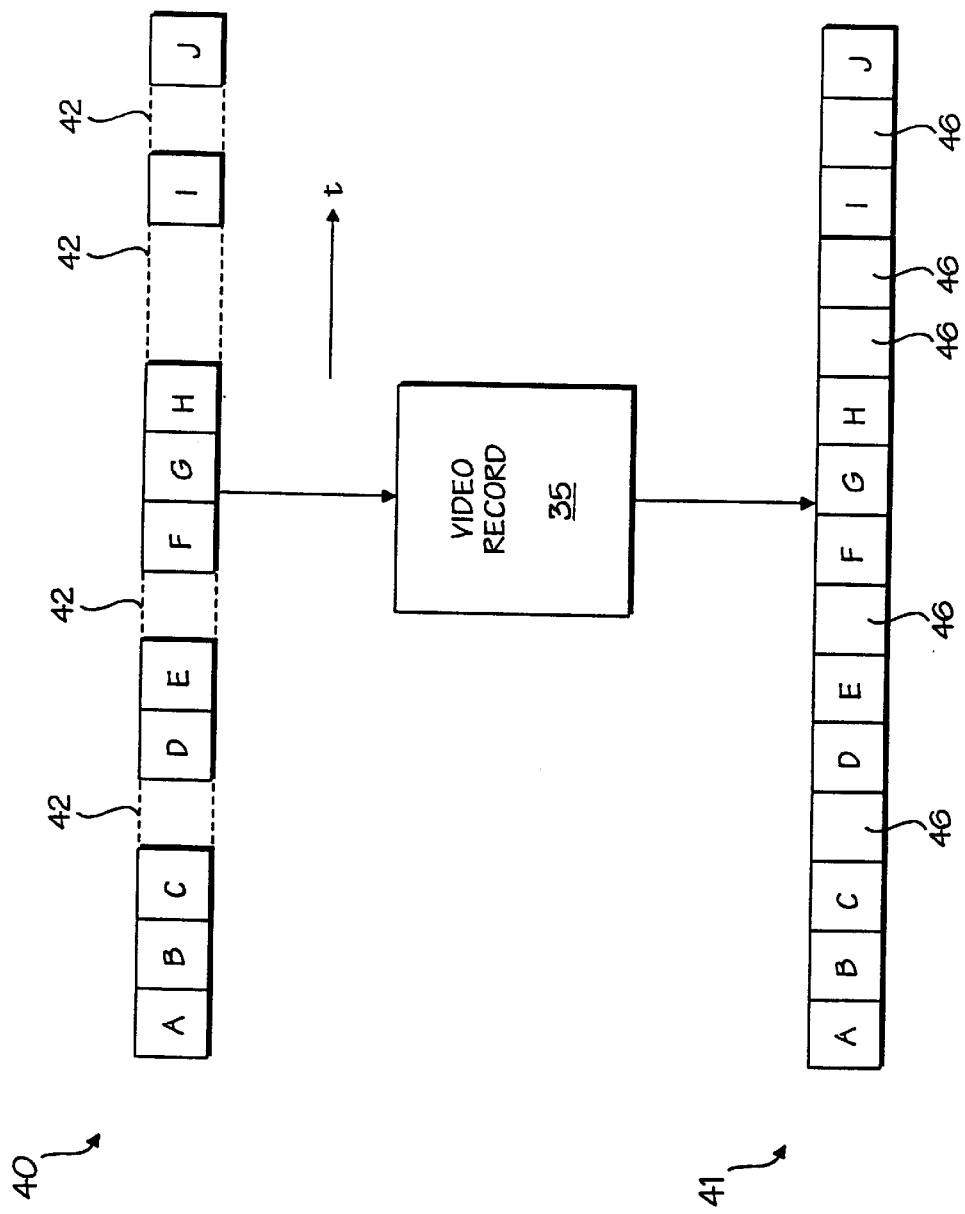
FIG. 4 illustrates a process of inserting "dummy" frames into a video stream.

FIG. 4 illustrates a process of inserting dummy frames into a received video stream in order to guarantee a constant predetermined frame rate. A video stream 40 is received over communication link 3 by a local processing system, such as computer system 1-1 in FIG. 1, from a remote processing system, such as any of the others of computer systems 1-2 through 1-N. The video stream 40 is associated with an audio stream (not shown in FIG. 4). The audio and video streams are "associated", or "corresponding", in that they represent audio and video information acquired concurrently by the camera 4 and the microphone 5 of one computer systems 1-2 through 1-N. The video stream includes video frames A through J, in that chronological order. As a result of the variable frame rate of the video data stream 40, gaps in time 42 appear between certain frames of the video data stream 40. Consequently, the video record process 35 of the application software 31 inserts dummy frames into the video data stream as necessary to guarantee a constant, predetermined video frame rate in the recorded data stream 41. The predetermined frame rate may be, for example, 15 frames-per-second. The number of dummy frames inserted, when divided by the constant frame rate, should be approximately equal to the delay required to preserve the constant frame rate. Consequently, as long as the recorded video stream is played back at the constant, predetermined frame rate, the video playback speed can be made to be the same as the original recording speed.

Figure 5:
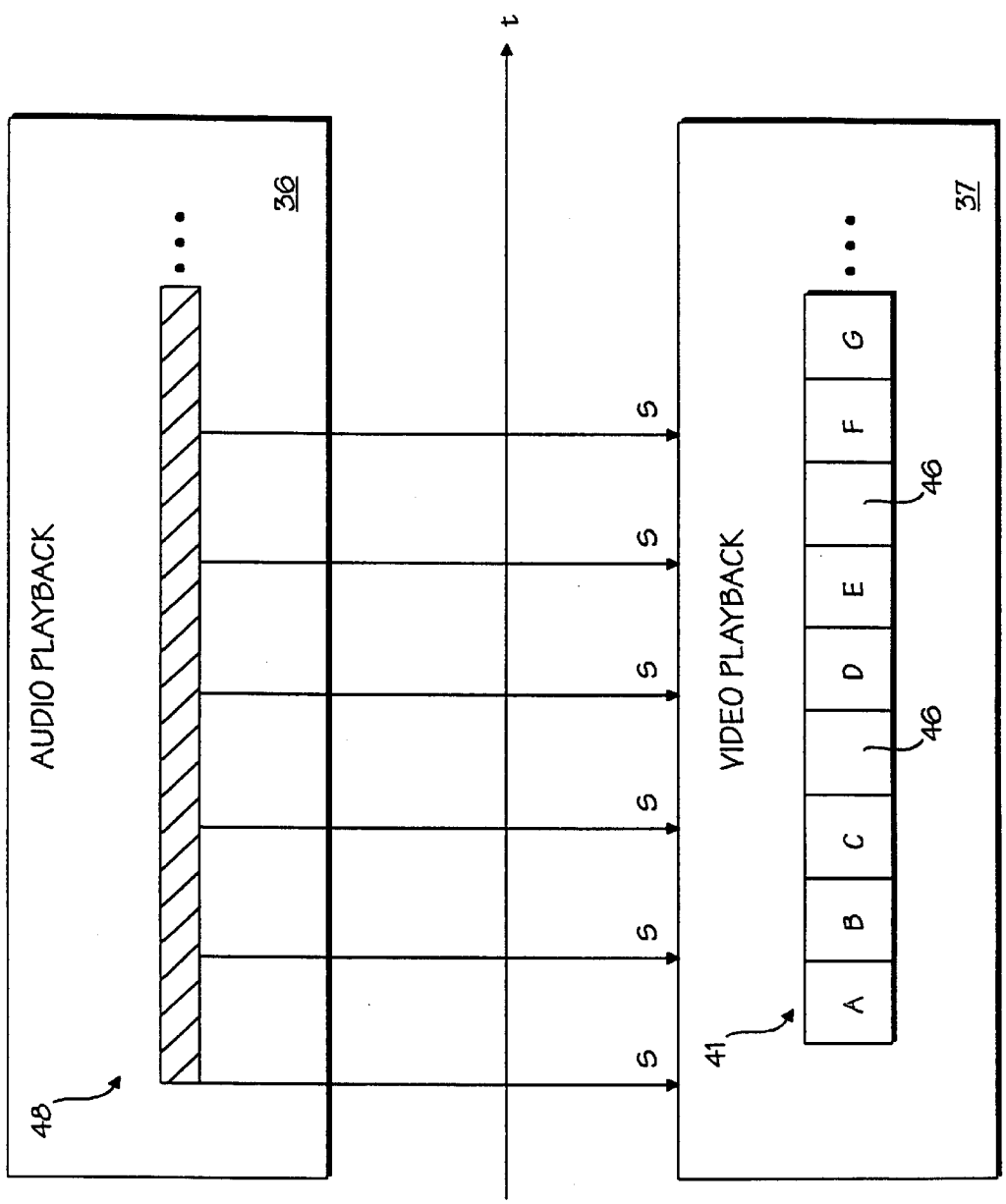
FIG. 5 illustrates providing synchronization information from an audio stream to a video playback process.

Also in accordance with the present invention, during the playback process, synchronization information from the audio stream is provided to the video playback process in order to initially synchronize playback of the recorded video data stream with the recorded audio data stream and to repeatedly resynchronize the two data streams thereafter. Referring now to FIG. 5, the audio playback process 36 plays back an audio data stream 40 while a video playback process 37 plays back the corresponding video data stream 41 from the same transmission. Synchronization information S is repeatedly provided by the audio playback process 36 to the video playback process 37 to synchronize the two data streams 41 and 48. More specifically, the synchronization information S is used by the video playback process 37 to adjust the rate of playback of the recorded video stream 41, as necessary to coincide with the playback of the recorded audio stream 48. The synchronization information S may include any information that indicates how much of the audio data stream 48 has been played so far, such the number of audio samples played. If the sample rate of the audio stream is known, then the synchronization information S may be an indication of the number of samples played; this indication can be used by the video playback process 37 to determine the total elapsed time for which the audio stream 48 has been playing. Alternatively, the information S may specify the elapsed time explicitly.

Thus, each process, audio and video, can predict its rate by using its own clock and does not depend on the arrival time of a transmission. Synchronization can be maintained even if the clock of each playback process is different. The playback processes communicate synchronization information to each other, and clock differences can be compensated for.

Figure 6:
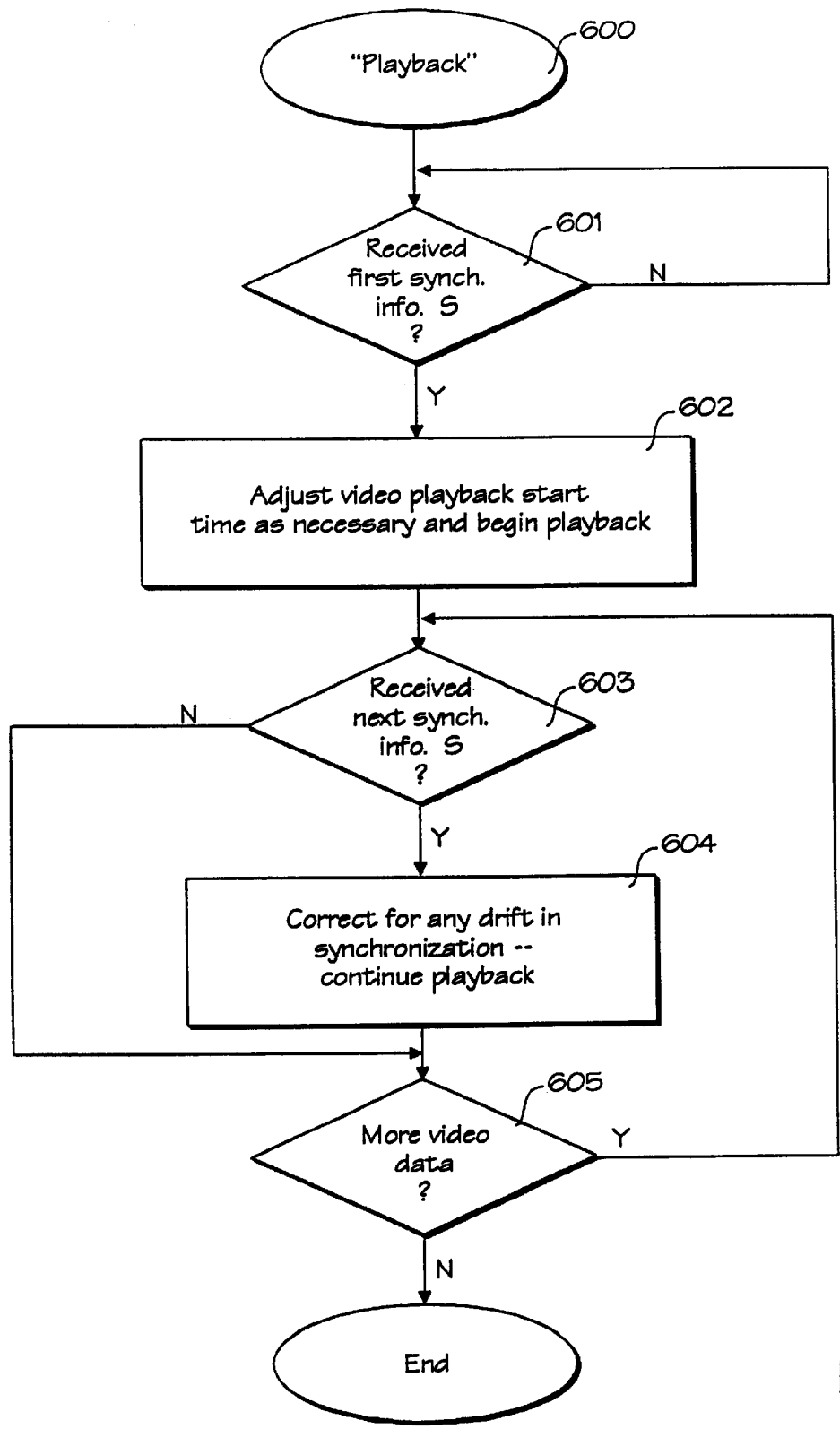
FIG. 6 is a flow diagram illustrating a routine for synchronizing audio and video streams in a video conferencing system.

FIG. 6 illustrates how the synchronization information S is used to synchronize the video data stream 41 with the audio data stream 48 in the video playback process 37. The routine of FIG. 6 may be embodied as part of the video conferencing application 31, as already noted. In response to a user input 600 requesting playback of a recorded transmission, the audio playback process 36 initially sends its synchronization information S to the video playback process to synchronize the start times of playing the video and audio data streams. Thus, if the initial synchronization information S has been received in step 601 by the video playback process 37, then in step 602 the video playback process 37 adjusts the video stream playback start time, as necessary to coincide with the start time of the audio data stream. Playback of the audio and video data streams is then initiated, with the start times having been synchronized. Next, in step 603, if the next synchronization information S has been received from the audio playback process 36, then in step 604 the video playback process 37 corrects the playback of the video data stream for any drift in synchronization that may have accumulated since the last correction. This correction may include increasing or decreasing the tempo of playback of the video data stream or pausing playback of the video data stream, for example. After making such a correction in step 604, or if the next synchronization information S had not yet been received in step 603, then it is determined in step 605 whether there is more video data to be played. If so, the routine repeats from step 603. Otherwise, the routine ends. Thus, when the video playback process 37 receives the audio synchronization information S for the first time, it adjusts the starting time of the video playback to eliminate the latency of the start times of the two data streams. When the video playback process receives subsequent synchronization information S from the audio playback process 36, that information is used to repeatedly correct for any drift in synchronization.

The above routine, therefore, in combination with the insertion of dummy frames into the video data stream as described above, provides for accurate synchronization of the corresponding audio and video data streams during playback. Hence, the present invention allows for synchronization of audio and video data streams without the use of time stamping in the recorded file. As a result, conventional formats, such as AVI, can be used, even when the recorded video is from a remote endpoint and has an unpredictable varying frame rate; only the nominal frame rate needs to be known. Further, synchronization is provided throughout the entire playback process, not just at the beginning, and is maintained regardless of the load on the local processing system. Even if one of the data streams is delayed, synchronization can be maintained. Each process, audio and video, can predict its playback rate by using its own clock and does not depend on the arrival time of a transmission. In addition, synchronization can be maintained even if the clock of each playback process is different. The playback processes communicate synchronization information to each other, and clock differences can be compensated for.

Thus, a technique for synchronizing recorded audio and video streams in a video conferencing system has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of synchronizing an audio stream with a video stream, the method comprising:

inputting an audio stream and an associated video stream, wherein a rate of one of the audio stream and the video stream is variable during the transmission while a rate of the other is substantially fixed; and playing the audio stream and the video stream, including using information from the audio stream to adjust the playing of the video stream without using video time stamp information.

2. A method according to claim 1, wherein the associated audio and video streams are received from a remote source and are part of a video conference transmission.

3. A method according to claim 1, wherein said using information from the audio stream to adjust the playing of the video stream comprises using information from the audio stream to synchronize the playing of the video stream with the playing of the audio stream, without using video time stamp information.

4. A method according to claim 3, further comprising recording the audio stream and the video stream after said inputting and prior to said playing, such that said playing is playing the recorded audio stream and the recorded video stream.

5. A method according to claim 1, wherein the associated audio and video streams are received over a computer network.

6. A method according to claim 1, wherein the video stream includes a plurality of video frames, the method further comprising inserting copies of video frames that are already present in the video stream into the video stream to maintain a substantially constant, predetermined video frame rate.

7. A method according to claim 4, wherein using information from the recorded audio stream to adjust the playing of the recorded video stream comprises:

using information from the recorded audio stream to synchronize a start of playing of the recorded audio stream with a start of playing of the recorded video stream; and repeatedly using information from the recorded audio stream to resynchronize the playing of the recorded audio stream with the playing of the recorded video stream.

8. A method according to claim 1, wherein the video stream includes a plurality of video frames, the method further comprising adding video frames into the video stream to maintain a substantially constant video frame rate.

9. A method according to claim 1, wherein the information from the audio stream comprises information indicative of a degree of progress of the playing of the audio stream.

10. A method according to claim 1, wherein the video stream includes a plurality of video frames, the method further comprising inserting blank video frames into the video stream to maintain a substantially constant, predetermined video frame rate.

11. An apparatus for synchronizing a video stream with a corresponding audio stream, the apparatus comprising:

means for recording the audio stream and the video stream, the video stream including a plurality of video frames, the means for recording including means for inserting extra frames into the video stream to maintain a constant, predetermined video frame rate during subsequent playback of the video stream; and means for playing back the recorded audio and video streams, including means for adjusting the playback of the video stream based on progress information from the audio stream.

12. An apparatus according to claim 11, wherein the audio and video streams are recorded audio and video streams of a real-time audiovisual data transmission from a remote source.

13. An apparatus according to claim 11, wherein the means for playing back the recorded audio and video streams comprises means for using information from the recorded audio stream to synchronize a start of playing of the recorded audio stream with a start of playing of the recorded video stream.

14. A machine-readable program storage medium tangibly embodying sequences of instructions, the sequences of instructions for execution by at least one processing system to perform a method of synchronizing corresponding audio and video data streams, the method comprising:

recording an audio stream and a corresponding video stream, the video stream including a plurality of video frames and having a variable frame rate, wherein recording the audio and video streams includes adding frames to the video stream based on the variable frame rate to simulate a constant, predetermined video frame rate; and playing back the recorded audio and video streams, including using information from the audio stream to synchronize the video stream with the audio stream.

15. A machine-readable program storage medium according to claim 14, wherein the audio and video streams recorded during said recording are from a real-time audiovisual data transmission from a remote processing system.

16. A machine-readable program storage medium according to claim 14, wherein playing back of the recorded audio and video streams comprises using information from the recorded audio stream to synchronize a start of playing of the recorded audio stream with a start of playing of the recorded video stream.

* * * * *